Sept. 3, 1929.    C. C. NEWMAN    1,727,175
CULTIVATOR ATTACHMENT FOR TRACTORS
Filed March 17, 1928    2 Sheets-Sheet 1
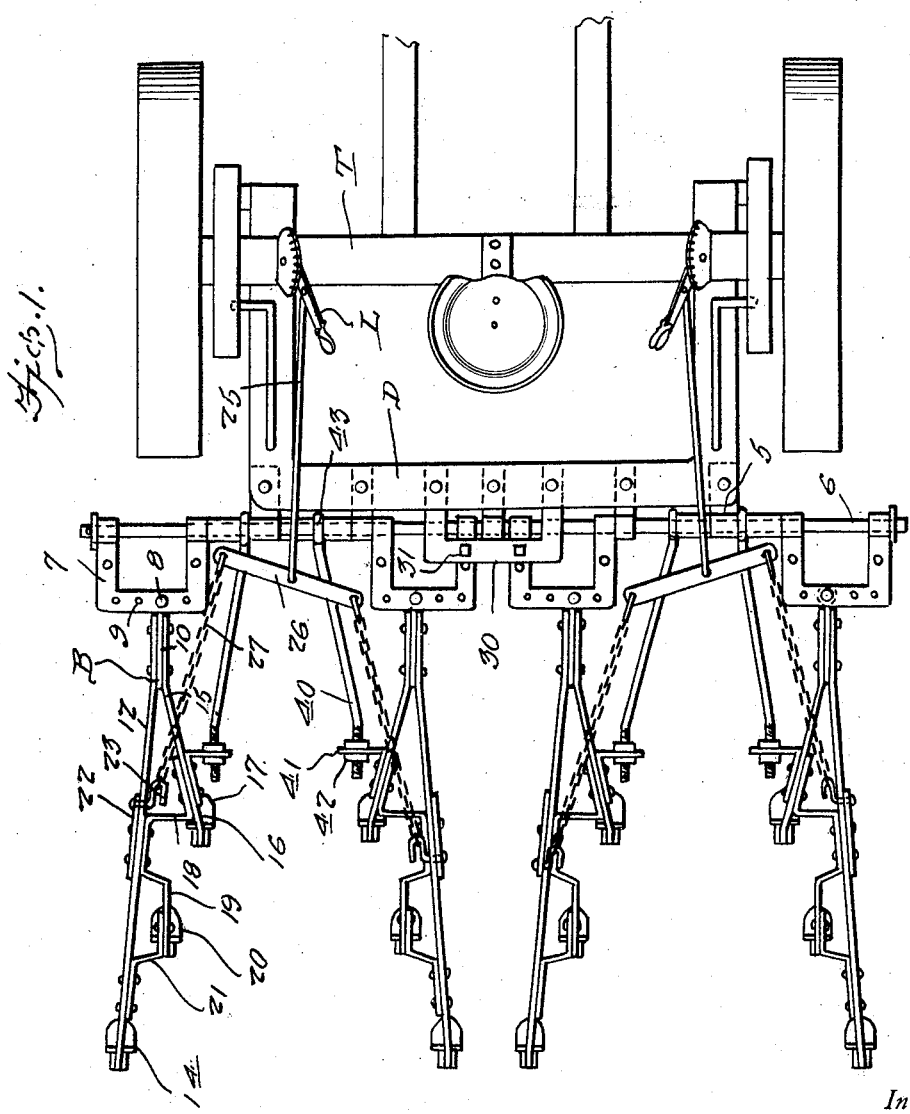
Inventor
Clemerd C. Newman
By Clarence A. O'Brien
Attorney

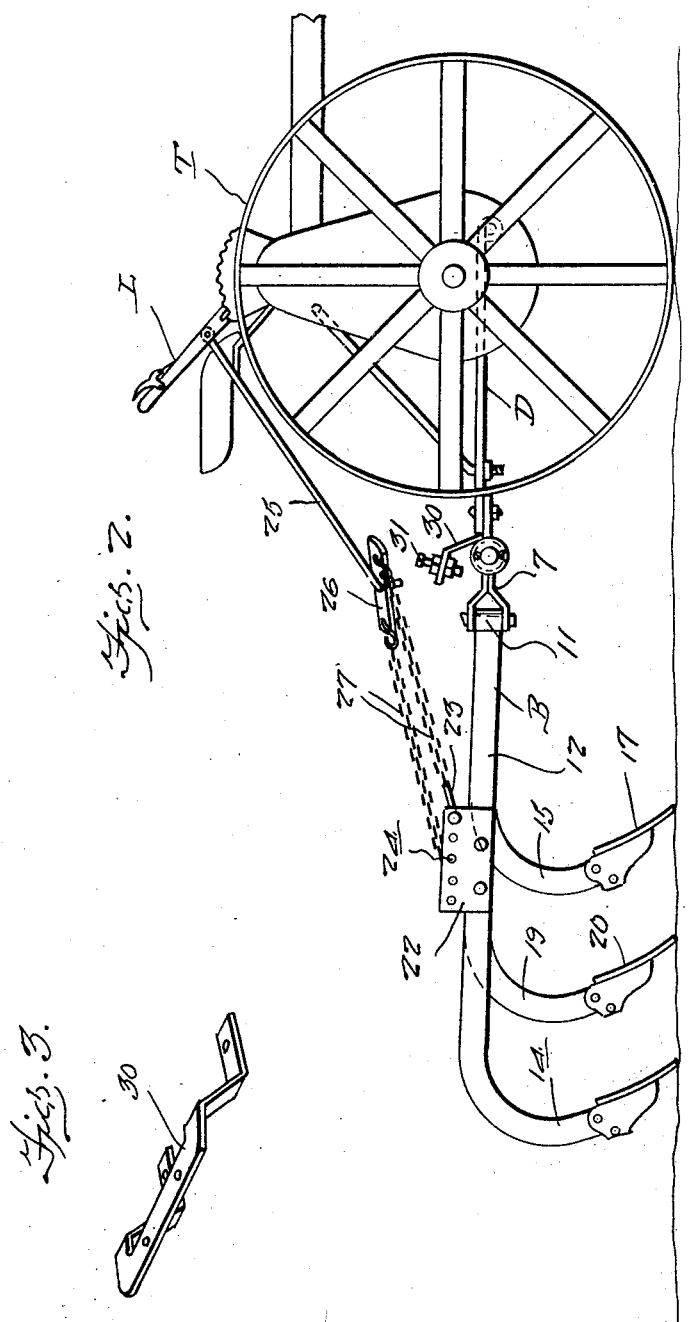

Patented Sept. 3, 1929.

1,727,175

UNITED STATES PATENT OFFICE.

CLEMERD C. NEWMAN, OF ARCANUM, OHIO.

CULTIVATOR ATTACHMENT FOR TRACTORS.

Application filed March 17, 1923. Serial No. 262,494.

The present invention relates to a cultivating attachment for tractors particularly of the well known Farmall tractor and has for its prime object to provide a two row cultivating attachment for engagement with the draw bar at the rear of the tractor.

Another very important object of the invention resides in a tractor cultivating attachment of this nature which operates at the same time in unison with the cultivator gangs of the tractor.

Another very important object is to provide a cultivating attachment of this nature which will eliminate the tractor wheel tracks and will cultivate hollows which may be in the ground.

A still further very important object of the invention resides in the provision of an attachment of this nature which is comparatively simple in its construction, inexpensive to manufacture, strong and durable, and thoroughly efficient and reliable for the purpose intended.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary top plan view showing the rear end of the tractor with my improved cultivator attachment associated therewith, Figure 2 is a side elevation thereof, and Figure 3 is a perspective view of a stop bracket.

Referring to the drawing in detail it will be seen that the letter T denotes generally a tractor of a well known type which is provided at its rear with a U-shaped draw bar D. Levers L are already provided on the tractor T for adjusting the cultivating implement usually associated therewith.

I fix to the draw bar D a plurality of bearing brackets 5 through which extend a shaft 6. U-shaped draw bars 7 are rockably engaged on the shaft 6 one pair adjacent the center of the draw bar D and one to each side thereof. On each draw bar 7 there is adjustably engaged as at 8 beam structures B. It will be noted that each draw bar is of double ply construction and that the bight portions are spaced so that the forward ends of the beam B extend therebetween. These bight portions have a plurality of apertures 9 through which the pins 8 extend. Each beam B comprises a bar 10 the forward end of which terminates in a sleeve 11 to extend between the bight of the plies of the draw bar 7 as is clearly illustrated in Figure 2.

A beam member 12 is attached to one side of the bar 10 and extends rearwardly therefrom and is relatively elongated having its rear end curved downwardly with a cultivator shovel 14 engaged thereon. A beam member 15 is fixed to the other side of the bar 10 and extends rearwardly and diverges to one side and to the rear end thereof is fixed a cultivator shank 16 with a shovel 17 on the lower end thereof. The rear end of the beam member 15 is braced in respect to the beam member 12 by means of brake structure 18 which is integral with a beam member 19 extending laterally from an intermediate portion of the beam member 12 and then extending rearwardly and downwardly and having a cultivator shovel 20 fixed on the end thereof.

This beam member 19 is braced in respect to the rear end of the beam member 12 by brace structure 21. A plate 22 is secured to the intermediate portion of the beam member 12 and supports a hook 23 which may be disposed through any one of a plurality of openings 24 in said plate.

The shovels 17, 20 and 14 are arranged one behind the other in the order indicated and offset laterally with respect to each other in the order indicated. A link 25 is pivotally engaged with the lever L and extends rearwardly and has on its rear end rockably mounted an equalizer bar 26 the ends of which are engaged in chains 27.

These chains 27 are engaged with two of the hooks 23. It will be noted that the beam structures B are arranged in pairs one pair being associated with each lever L and the hooks on the inner beam of the pairs are located more rearwardly than the hooks on the outer beam structure so that when the lever is rocked the inner beam structure will be caused to swing upwardly first and after it is raised a certain distance to equalize the leverage between the beam structures both beams will then move up in unison. In order to limit the upward swinging movement of the beam structures, there is provided a bracket 30 of U-shaped construction having its blades offset so that the bight is disposed upwardly from the extremities of the legs, the extremities of the legs being fixed to the central portion of the draw bar D and the center of the draw bars 7 will abut the set screws 31 threaded through the bight of the bracket 30 to limit the upward movement thereof.

Rods 40 have eyes 43 receiving the shaft 6 and have an adjustable connection by nuts 42 to brackets 41 secured to beam members 15.

From the above detailed description it will be seen that this cultivator attachment is arranged at the rear end of the tractor and will cultivate the ground over which the wheels of the tractor pass and the cultivators are free to follow the contour of the ground as humps and hollows are encountered.

It is thought that the construction, utility and advantages of the invention will now be quite apparent to those skilled in this art without a more detailed description thereof. The present embodiment of the invention has been disclosed in detail merely for the purposes of exemplification since in actual practice it attains the features of advantage enumerated as desirable in the statement of the invention and the above description. It will be apparent that changes in the details of construction and in the combination and arrangement of parts may be resorted to without departing from the spirit or scope of the invention as hereinafter claimed or sacrificing any of its advantages.

Having thus described my invention, what I claim as new is:

1. An attachment of the class described comprising a shaft, means for mounting the shaft transversely behind the draw bar of a tractor, a plurality of draw bars rockable on the shaft, beam structures engaged with the plurality of draw bars, cultivating elements on the beam structures, an equalizing bar associated with each pair of beam structures, chains extending from the ends of the equalizer bar and connected with the beam structures, links pivotally connected with the equalizer bar at intermediate points thereof, and levers connected with the links to raise and lower the beam structures.

2. An attachment of the class described comprising a shaft, means for mounting the shaft transversely behind the draw bar of a tractor, a plurality of draw bars rockable on the shaft, beam structures engaged with the plurality of draw bars, cultivating elements on the beam structures, an equalizing bar associated with each pair of beam structures, chains extending from the ends of the equalizer bar and connected with the beam structures, links pivotally connected with the equalizer bar at intermediate points thereof, levers connected with the links to raise and lower the beam structure, each beam structure comprising a bar attached to the adjacent draw bar, a beam member fixed to one side thereof and extending rearwardly and terminating in a downwardly disposed extension, a second beam member fixed to the other side of the last mentioned bar, and curved downwardly and diverging from the first mentioned beam member, bracing means between the beam members, a third beam member extending outwardly from the intermediate portion of the first beam member and having a downwardly disposed terminal, the cultivating elements being fixed to the lower extremities of the beam members.

3. An attachment of the class described comprising a shaft, means for mounting the shaft transversely behind the draw bar of a tractor, a plurality of draw bars rockable on the shaft, beam structures engaged with the plurality of draw bars, cultivating elements on the beam structures, an equalizing bar associated with each pair of beam structures, chains extending from the ends of the equalizer bar and connected with the beam structures, links pivotally connected with the equalizer bar at intermediate points thereof, levers connected with the links to raise and lower the beam structure, each beam structure comprising a bar attached to the adjacent draw bar, a beam member fixed to one side thereof and extending rearwardly and terminating in a downwardly disposed extension, a second beam member fixed to the other side of the last mentioned bar, and curved downwardly and diverging from the first mentioned beam member, bracing means between the beam members, a third beam member extending outwardly from the intermediate portion of the first beam member and having a downwardly disposed terminal, the cultivating elements being fixed to the lower extremities of the beam members, a plurality of braces rockable on the shaft, and means for adjustably connecting the braces with the second beam members.

In testimony whereof I affix my signature.

CLEMERD C. NEWMAN.